Feb. 20, 1968     E. C. LOWE     3,370,118

CORRUGATING METHOD

Filed Sept. 21, 1964

INVENTOR.
EDWIN C. LOWE
BY Forrest J. Lilly
ATTORNEY

United States Patent Office 3,370,118
Patented Feb. 20, 1968

3,370,118
CORRUGATING METHOD
Edwin C. Lowe, Van Nuys, Calif., assignors to Robbins Aviation, Inc., Vernon, Calif., a corporation of California
Filed Sept. 21, 1964, Ser. No. 397,868
2 Claims. (Cl. 264—325)

ABSTRACT OF THE DISCLOSURE

A process for producing circumferential corrugations in a sealing sleeve composed of polytetrafluoroethylene wherein a blank sleeve is placed on a mandrel coaxially positioned inside a cylindrical forming cavity, and end pressure is then exerted on the ends of the sleeve, causing it to buckle laterally and circumferentially into a succession of corrugations, with the further feature that the corrugations are inclined in one direction relative to the axis of the sleeve, and thereby affording an improved sealing function.

---

This invention relates generally to the art of corrugating flexible materials and, more particularly, to a method for forming corrugated structures.

My copending application Ser. No. 397,837 filed Sept. 21, 1964, and entitled, Dynamic Shaft Seal, discloses a shaft sealing element comprising a sleeve-like body of yieldable, flexible, low friction material including end shoulders joined by an intervening, corrugated sleeve wall of reduced radial thickness relative to the shoulders and defining a plurality of axially spaced convolutions or corrugations extending circumferentially about the wall. This shaft seal is preferably composed of polytetrafluoroethylene, a synthetic resin commonly sold under the trademark Teflon, although it may be constructed of other suitable yieldable, flexible, low friction materials.

The present invention relates to a unique method for forming the corrugations in the shaft seal of my copending application. It will become readily apparent as the description proceeds, however, that the invention may be used to advantage for forming corrugated structures other than corrugated sleeves.

It is a general object of the present invention, therefore, to provide a new and unique method for forming corrugations in a workpiece of flexible material.

Another object of the invention is to provide a method for making the dynamic shaft seal of my aforementioned copending application.

Other objects, advantages, and features of the invention will become readily apparent as the description proceeds.

Briefly, the objects of the invention are attained by providing a corrugating method wherein a flexible workpiece to be corrugated is confined in a cavity having a transverse dimension greater than the thickness of the workpiece and approximating the desired overall dimension of the corrugations in the finished corrugated structure. The workpiece is then compressed longitudinally, while thus confined in the cavity, so as to cause the workpiece to buckle laterally, as it were, against the opposing cavity walls. It has been found that this buckling process occurs in such a way as to form generally uniformly shaped corrugations or convolutions in the workpiece.

The method will now be described in greater detail by reference to the attached drawing, wherein.

Figure 5:
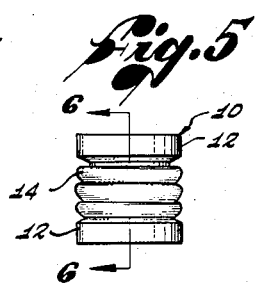
FIG. 5 is a side elevation of the finished part.
Figure 6:
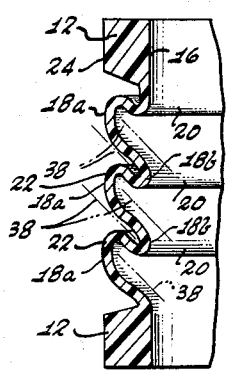
FIG. 6 is an enlarged section taken on line 6—6 in FIG. 5.

As mentioned earlier, the present method is intended primarily for making a corrugated or convoluted dynamic shaft seal of the type disclosed in my aforementioned copending application Ser. No. 397,837. FIGS. 5 and 6 illustrate this shaft seal in its finished form. The illustrated shaft seal 10 is constructed of a yieldable, flexible, low friction material, such as polytetrafluoroethylene, and known commonly by its trademark Teflon. Seal 10 includes end shoulders 12 of generally rectangular cross section which are joined by an intervening corrugated sleeve wall 14 of less radial thickness than the shoulders 12. The inner surfaces of the wall 14, at the points where the wall joins to the shoulders 12, are substantially flush with the inner surfaces 16 of the shoulders. Wall 14 includes a multiplicity of axially spaced, circumferentially extending corrugations 18a and 18b. Corrugations 18a are outwardly directed. Corrugations 18b are inwardly directed. The inwardly directed corrugations 18b have inner sealing surfaces 20 of substantially uniform diameter approximately equal to the diameter of inner sealing surfaces 16 on the shoulders 12. The outwardly directed corrugations 18a have outer circular sealing surfaces 22 of substantially uniform diameter substantially equal to the diameter of outer sealing surfaces 24 on the shoulders 12. The inner and outer sealing surfaces 16, 20, 22 and 24 are preferably substantially coaxial.

Figure 1:
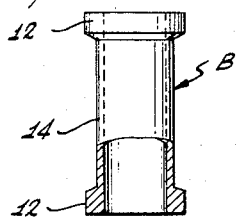
FIG. 1 is a side elevation, partly broken away, of a preformed blank used in the present corrugating method.

According to the present invention, seal 10 is made from a sleeve blank B which is preformed, in any convenient way, to the shape illustrated in FIG. 1. Blank B, for example, may be molded or machined to the illustrated shape. Blank B is inserted axially into an annular forming cavity 26 within a rigid housing or body 28. Cavity 26 is defined by an outer cylindrical wall 30, an inner cylindrical wall 32, and an annular end wall 34. In the illustrated forming apparatus, the housing 28 is a barrel open at each end and the inner cavity wall 32 is furnished by a cylindrical mandrel 32a which extends axially through the barrel. Mandrel 32a has a cylindrical collar 34a on one end which fits slidably in the barrel. The inwardly facing surface of this collar forms the end wall 34. The opposite end of the cavity is open to permit insertion of the blank B into the cavity. The diameter of the inner cavity wall 32 is substantially equal to or just slightly less than the diameter of the central opening through the sleeve blank B, and the radial dimension of the cavity, that is, the radial spacing between the walls 30 and 32, is substantially equal to or just slightly greater than the radial thickness of the shoulders 12 on the blank B. It is apparent, therefore, that the blank has a relatively close slip fit within the forming cavity 26.

After insertion of the preformed blank B into the forming cavity 26, an annular forming plunger or ram 36 is inserted into the open end of the cavity. This ram is dimensioned to have a slip fit in the barrel 28 and on the mandrel 32a. Ram 36 is driven inwardly in the cavity, to axially compress the preformed sleeve blank B, in any convenient way, as by applying a force F to the outer end of the ram. The required driving force may be exerted on the ram by a hydraulic piston or other force exerting device, not shown. At this time, the forming apparatus is supported on a surface 37 which retains the mandrel 32a in the barrel.

Figures 2, 3:
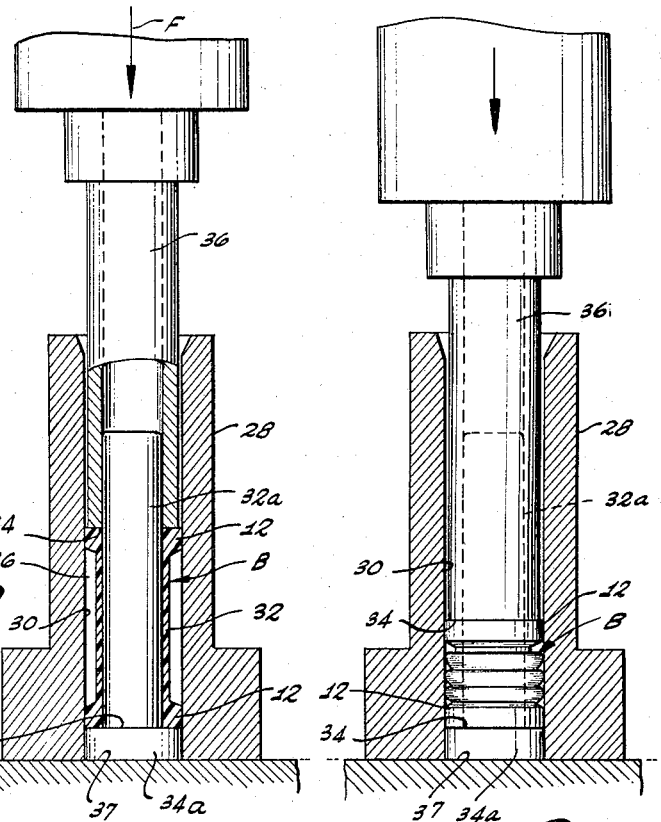
FIG. 2 is an axial section through apparatus used in carrying out the present corrugating method and illustrating the parts of the apparatus in the positions they occupy at the outset of the corrugating operation.
FIG. 3 is a view similar to FIG. 2 illustrating the corrugating apparatus at the conclusion of the corrugating operation.
Figure 4:
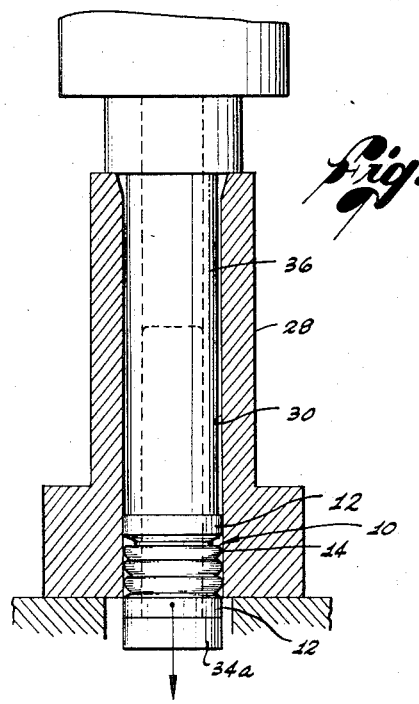
FIG. 4 illustrates the finally corrugated part being ejected from the apparatus.

During axial compression of the sleeve blank B which occurs in response to inward movement of the ram 36, the sleeve wall 14 buckles, in the manner illustrated in FIG. 3. The buckling of the sleeve wall is limited by the cylindrical walls 30 and 32 of the forming cavity 26. It has been found that this buckling process occurs in such a way as to form the generally uniform corrugations 18a and 18b in the sleeve wall. After compression, the corrugated sleeve and mandrel 32a are ejected through the lower end of the barrel, as shown in FIG. 4. The precise phenomenon which occurs in the sleeve wall 14 during the buckling process to form corrugations 18a and 18b of the shape illustrated is not known. It is known, however, that the present method is effective to form such corrugations.

By way of example, corrugated sleeves according to the invention have been formed in the manner described above from sleeve blanks of Teflon which were preformed, by machining, to the shape illustrated in FIG. 1. These blanks had an outer diameter, at the shoulders 12, of .358 inch, an inner central opening of .246 inch in diameter, and a radial thickness, at the reduced wall portion 14, of .020 inch. The overall length of the blanks was .750 inch. During the actual corrugating operation, the travel of the ram 36, following its initial contact with the sleeve blank, was on the order of .375 inch.

It will be observed in FIG. 6 that the axis 38 of each radial section of each corrugation 18a and 18b in the finished seal 10 is inclined at an acute angle to the axis of the seal. The reason for this inclination of the corrugation axis is not understood, but is advantageous in the performance of the sealing function, as explained in my aforementioned copending application.

It will be immediately apparent to those skilled in the art that while the invention has been described in connection with forming the corrugated, Teflon seal of my aforementioned copending application Ser. No. 397,837, the invention may be used to advantage for forming corrugated structures of other shapes, from other materials, and for other purposes. For example, a flat sheet may be corrugated by confining the sheet in a flat cavity somewhat wider than the thickness of the sheet and longitudinally loading the sheet to cause it to buckle in much the same manner as the sleeve described above.

Moreover, it will be apparent that the number of corrugations which are formed by the practice of the present method may be varied by varying the dimensions of the sleeve blank and/or the axial compression of the blank during the corrugating operation. In some cases, for example, it may be desirable to form a single corrugation in a sleeve. Attention is directed to the fact that when forming the illustrated corrugated seal 10, the slip fit of the end shoulders 12 in the forming cavity 26 serves to restrain the ends of the sleeve against lateral movement in the forming cavity. In the event the method is utilized to form a corrugated sleeve, other than the corrugated seal 10, in which the shoulders 12 are not desired, such shoulders could be removed after the corrugating operation. In the alternative, the ends of the sleeve could be laterally restrained in some other way, such as by engaging the ends of the sleeve in annular grooves in the end wall 34 of the housing 28 and in the corrugating plunger 36. However, it may be desirable in some cases to not so laterally restrain the ends of the sleeve in order to form corrugations at the extremities of the sleeve.

Various other modifications in the invention are possible, of course, within the spirit and scope of the following claims.

I claim:

1. The method of forming a plurality of circumferentially extending corrugations in a sleeve of polytetrafluoroethylene, or the equivalent, which comprises the steps of:

positioning said sleeve in a cylindrical forming bore around a coaxially located mandrel therein, said bore and mandrel having cylindrical wall surfaces spaced by a radial distance greater than the thickness of the sleeve wall to be corrugated, and buckling the sleeve, while in said forming bore, laterally and circumferentially into a succession of corrugations inclined at an angle relative to the axis of the sleeve and composed of alternate, inclined, outwardly and inwardly directed corrugation loops, confined respectively by said bore and said mandrel, by application of a longitudinal compressing force to one end thereof, while supporting it from its opposite end, and thereby axially compressing and shortening it, so as to cause it to uniformly subdivide and buckle into outwardly and inwardly directed corrugation loops which engage the wall surfaces of the confining bore and mandrel and move to and assume a final set position at an incline to the axis of the sleeve, thereby affording an improved sealing function.

2. The method of claim 1, including the steps of supporting said sleeve from one end thereof while compressing it from the other by means of a sleeve-like ram advanced in said bore around said mandrel.

References Cited

UNITED STATES PATENTS 2,347,101  4/1944  Harding _____ 264—339

FOREIGN PATENTS 1,257,165  2/1961  France.
626,775   3/1936  Germany.
26,973    4/1932  Netherlands.

ROBERT F. WHITE, *Primary Examiner.*

R. R. KUCIA, *Assistant Examiner.*